United States Patent
Thurmeier et al.

(10) Patent No.: US 10,892,455 B2
(45) Date of Patent: Jan. 12, 2021

(54) SYSTEM FOR PRODUCING A BATTERY ARRANGEMENT

(71) Applicant: AUDI AG, Ingolstadt (DE)

(72) Inventors: Markus Thurmeier, Adlkofen (DE); Martin Simon, Ingolstadt (DE); Oliver Schieler, Kaiserslautern (DE)

(73) Assignee: AUDI AG, Ingolstadt (DE)

( * ) Notice: Subject to any disclaimer, the term of this patent is extended or adjusted under 35 U.S.C. 154(b) by 150 days.

(21) Appl. No.: 16/402,458

(22) Filed: May 3, 2019

(65) Prior Publication Data

US 2019/0341593 A1    Nov. 7, 2019

(30) Foreign Application Priority Data

May 3, 2018   (DE) .................. 10 2018 206 800

(51) Int. Cl.
*H01M 2/10* (2006.01)
*H01M 10/04* (2006.01)
*H01M 10/653* (2014.01)
*H01M 10/655* (2014.01)

(52) U.S. Cl.
CPC ....... *H01M 2/1094* (2013.01); *H01M 2/1077* (2013.01); *H01M 10/0404* (2013.01); *H01M 10/653* (2015.04); *H01M 10/655* (2015.04); *Y02E 60/10* (2013.01)

(58) Field of Classification Search
CPC . H01M 2/02–0295; H01M 2/10–1094; H01M 10/04–049; H01M 10/60–625; H01M 10/65–653
See application file for complete search history.

(56) References Cited

U.S. PATENT DOCUMENTS

| 2007/0259258 A1 | 11/2007 | Buck |
| 2012/0003508 A1 | 1/2012 | Narbonne et al. |
| 2016/0111396 A1* | 4/2016 | Kim ............ H01L 21/565 257/686 |

(Continued)

FOREIGN PATENT DOCUMENTS

| DE | 102007063194 A1 | 6/2009 |
| DE | 102017116420 A1 | 1/2018 |

OTHER PUBLICATIONS

German Search Report dated Dec. 17, 2018 in corresponding German Application No. 10 2018 206 800.3; 24 pages.

*Primary Examiner* — Jonathan Crepeau
*Assistant Examiner* — Jacob Buchanan
(74) *Attorney, Agent, or Firm* — Maier & Maier, PLLC

(57) ABSTRACT

A system for producing a battery arrangement with at least one battery module and a battery housing. The at least one battery module comprises at least one supply channel which extends in a designated introduction direction through the at least one battery module. The at least one battery module is to be introduced in the introduction direction into the battery housing, positioned in an end position provided for the battery module and firmly connected in this end position to the battery housing. Between a bottom of the at least one battery module and a bottom of the battery housing, at least one cavity is provided, which is to be connected to the at least one supply channel. A filler material is to be filled into the at least one cavity through the at least one supply channel.

9 Claims, 4 Drawing Sheets

(56) References Cited

U.S. PATENT DOCUMENTS

2018/0026321 A1\* 1/2018 Rhodes ............... H01M 10/613
                                                             429/120
2018/0205055 A1\* 7/2018 Hilligoss ............. H01M 2/1094
2019/0051954 A1\* 2/2019 Kim ........................ H01M 2/10

\* cited by examiner

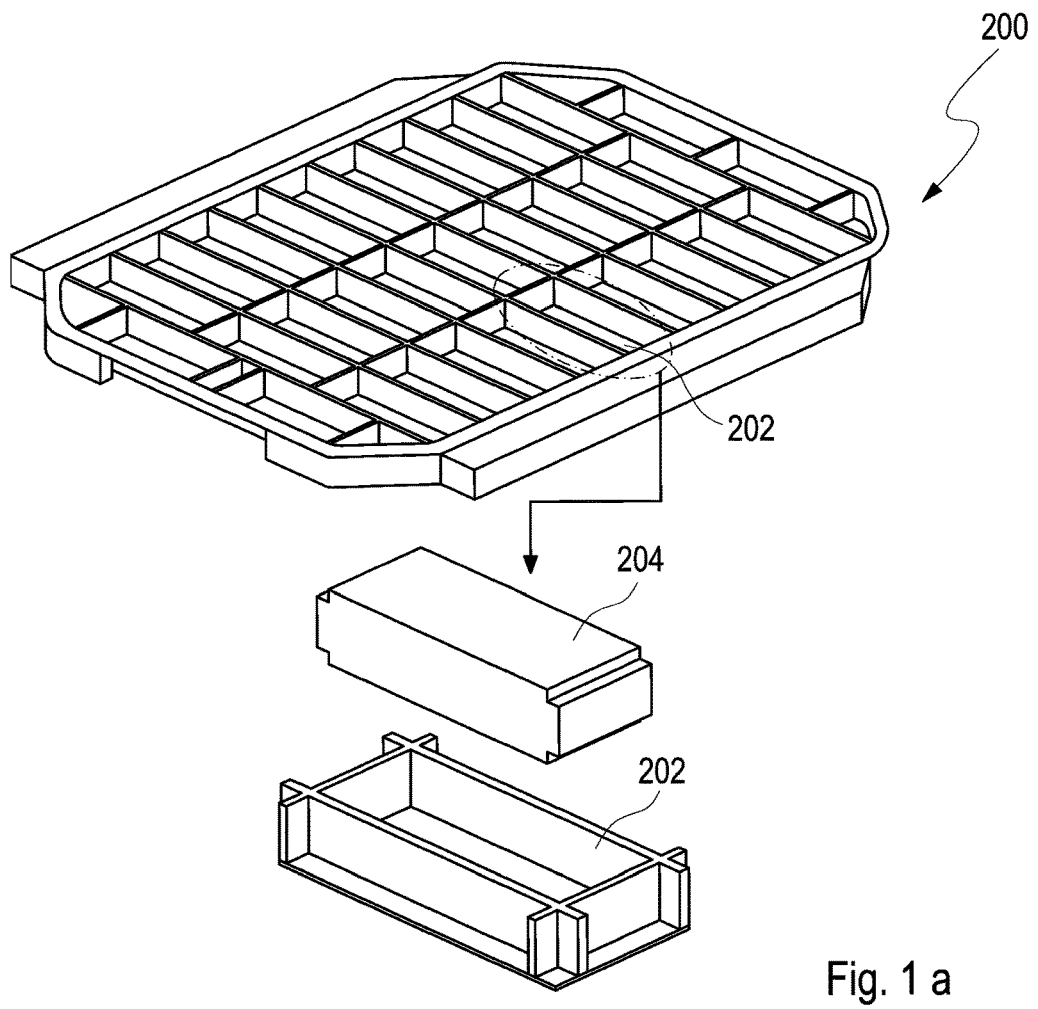
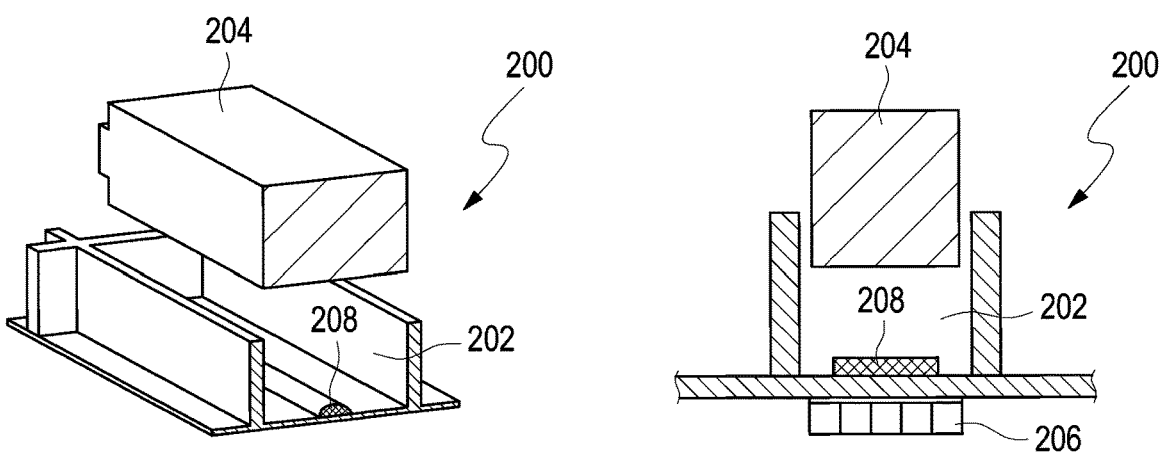
Fig. 1 b
(Prior Art)
Fig. 1 c
(Prior Art)

SYSTEM FOR PRODUCING A BATTERY ARRANGEMENT

FIELD

The invention relates to a system and to a method for producing a battery arrangement.

A battery arrangement for a vehicle comprises a battery tray or a battery housing, wherein a battery module is inserted into a respective battery housing. Here, it must be taken into consideration that there must be a good heat contact between the battery module and the battery housing.

BACKGROUND

The published document US 2007/259258 A1 describes a battery arrangement with a temperature control device. This battery arrangement comprises multiple battery cells surrounded by a housing, wherein a foam material is injected into the housing in order to fill an air gap between a battery cell and the housing and in order to absorb heat from the battery cell.

A battery with electrochemical generators is known from the published document US 2012/003508 A1. Here, the generators are surrounded by a housing, wherein an expanding foam is introduced between the generators and the housing.

A cell group consisting of multiple individual cells is known from the published document DE 10 2007 063 194 A1. For the formation of this cell group, the individual cells are surrounded by a curing filler material and then inserted into a housing.

SUMMARY

On this background, the aim was to improve a thermal conductivity between a battery module and a battery housing into which the battery module is to be inserted.

The system according to the invention is designed to produce a battery arrangement consisting of at least one battery module and a battery housing. The at least one battery module comprises at least one supply channel or injection channel which extends through the at least one battery module in a designated introduction direction for introducing or inserting the at least one battery module into the battery housing and is integrated therein. In the production of the battery arrangement, the at least one battery module is to be introduced in the introduction direction into the battery housing, positioned in an end position provided for the battery module and firmly connected in this end position to the battery housing. This means that the battery module is configured to be introduced in the introduction direction into the battery module, positioned in an end position provided for the battery module and firmly connected to the battery housing in this end position. Between a bottom of the at least one battery module and a bottom of the battery housing, after the positioning of the battery module in the designated end position and/or after connecting the battery module to the housing, at least one cavity or hollow space and/or flow channel is provided, to be formed and/or to be made available, wherein the at least one cavity is to be connected to the at least one supply channel in particular fluidically. This means that the cavity and the supply channel are automatically positioned relative to one another after proper positioning of the battery module in the designated end position and/or after proper connection of the battery module to the battery housing, so that they are fluidically connected to one another. Thereafter, i.e., as soon as the at least one battery module is introduced into the battery housing and was attached in the end position to the battery housing, a filler material is filled into the at least one cavity through the at least one supply channel. At least the at least one supply channel and the at least one cavity are provided as components of the system.

The at least one battery module comprises several components, wherein the at least one supply channel is arranged between at least two components of the at least one battery module and is delimited thereby. Said at least one supply channel extends between an inlet opening accessible from outside, which is arranged on at least one outer wall usually designed as lid and thus a component of the at least one battery module, and an of outlet opening on at least one outer wall which is formed as bottom and thus a component of the at least one battery module which leads into the cavity and is delimited by an inner wall. The at least one component of the at least one battery module is designed as battery cell and/or as an outer wall or side wall, longitudinal web and/or pressure plate, wherein a side wall is arranged between the cover and the bottom of the at least one battery module.

The system comprises at least one dispenser for providing the filler material, which comprises a discharge opening from which the filler material is to be conveyed or is conveyed. Here, it is possible that the discharge opening is to be arranged or is arranged at the inlet opening, for example, outside of the inlet opening, or in the inlet opening of the at least one supply channel. It is also possible that the discharge opening is to be arranged or is arranged within the supply channel between the inlet opening and the outlet opening. The at least one dispenser can comprise a supply lance, at the end of which the discharge opening is located or arranged.

Along the at least one supply channel, between the inlet opening and the outlet opening, on the inner wall of the supply channel, a transition site is provided, wherein a dimension, for example, a diameter, of the cross-sectional area of the inner wall changes at the transition site. It is also possible that the at least one supply channel comprises only one section, the inner wall of which has a cross-sectional area with constant diameter between the inlet opening and the outlet opening, i.e., that the supply channel, between inlet and outlet opening, is, for example, cylindrical. Moreover, it is possible that the at least one supply channel is subdivided into two sections, wherein a first section comprises, between the inlet opening and the transition site, an inner wall with unchanging, i.e., constant cross-sectional area, i.e., for example, a cylindrical inner wall, wherein a second section between the transition site and the outlet opening, at the outlet opening, comprises an inner wall with larger cross-sectional area than at the transition site or than in the first section.

In another design, the system points has at least one bead on the bottom of the battery housing, which, at least as a portion of a wall of the at least one cavity, is designed to delimit the at least one cavity.

As a rule, the system comprises at least one supply channel, i.e., one supply channel or multiple supply channels per battery module. In addition, as a rule, the system comprises at least one cavity, i.e., one cavity or multiple cavities formed between the bottom of the battery housing and the bottom of the at least one battery module, as soon as the battery module is positioned in its end position in the battery housing. Here, the at least one supply channel leads into the at least one cavity, or the multiple supply channels lead into corresponding multiple cavities.

The method according to the invention is provided for producing a battery arrangement consisting of at least one battery module and a battery housing, wherein the at least one battery module comprises at least one supply channel which extends in an introduction direction provided for the at least one battery module through the at least one battery module. The at least one battery module is introduced in the introduction direction into the battery housing and arranged therein, positioned in an end position provided for the battery module and firmly connected in this end position to the battery housing and fastened therein. Between a bottom of the at least one battery module and a bottom of the battery housing, at least one cavity, as hollow space and/or flow channel, is provided, formed or made available, which is connected, in particular fluidically connected, to the at least one supply channel. As soon as the at least one battery module is fastened in the battery housing or firmly connected thereto, a filler material is then filled through the at least one supply channel into the at least one cavity.

The battery arrangement produced in this manner comprises a number of battery modules which are arranged in the battery housing, wherein the battery housing is designed as and/or should be referred to as battery tray. If, in the battery arrangement, multiple battery modules and thus battery cells are arranged, it is possible that a respective battery module is arranged in a compartment within the battery housing, wherein individual compartments and thus battery modules arranged therein are separated from one another by partition walls which delimit individual compartments.

The battery arrangement or the at least one battery module arranged therein is provided as electrical energy source for at least one electrical consumer. Here, it is possible that such an electric consumer is designed as part of a vehicle, for example, of a motor vehicle or car, and moreover, for example, designed as an electric machine, wherein such an electric machine moreover is designed for driving the vehicle. The battery arrangement in this case is arranged in the vehicle.

The at least one battery module is screwed to the battery housing and in the process rigidly and firmly connected to the battery housing.

By means of the at least one supply channel, a heat conducting filler material and thus a heat conducting medium is filled into the at least one cavity between the at least one battery module and the battery housing.

In addition, between the bottom of the at least one battery module and the bottom of a battery housing, on at least one margin of the at least one cavity, compressible additional material is arranged, wherein the at least one battery module is subsequently arranged in the battery housing, wherein the compressible additional material is designed to delimit the cavity. Thus, on the at least one margin, by means of the additional material, a flow control is integrated in order to control the entry of the filler material or gap filler into the at least one cavity.

The filler material is conveyed in z direction as introduction direction parallel to the force of gravity into the at least one cavity between the bottom as an outer wall of the at least one battery module and the bottom as inner wall of the battery housing.

By providing the at least one supply channel for conveying the filler material, an injection unit is integrated in the at least one battery module.

In an embodiment of the method, the at least one battery module is first inserted in the battery housing and arranged therein. Subsequently, for example, by carrying out a screwing process or by screwing using at least one screw, the at least one battery housing is fastened in the end position in the battery housing. It is only then that the filler material or a gap filler is injected through the at least one supply channel into the at least one cavity between the battery housing, which can be designed as battery tray, and the at least one battery module.

The at least one battery module comprises, as components, the at least one battery cell which is surrounded or encased by at least one outer wall and thus also by the bottom of the at least one battery module. The at least one supply channel or the at least one corresponding supply opening or injection opening for the filler material as heat conducting medium passes through or traverses the at least one battery module parallel to the designated introduction direction.

It is possible that, within the at least one battery module, the at least one supply channel has a geometry which broadens from the inlet opening to the outlet opening in the direction of the bottom of the battery housing or of the battery tray and comprises, for example, in some sections a conical inner wall, whereby a pressure of the filler material to be introduced is decreased. This means that, starting from the inlet opening in the direction of the outlet opening, the inner wall of the supply channel has a broadening geometry toward the bottom of the battery housing.

It is also possible to introduce the discharge opening of the at least one dispenser into the at least one supply channel and arrange it therein, whereby a quantity of the filler material to be conveyed is reduced. Here, in an embodiment of the method according to the invention, it is possible to arrange the discharge opening for the filler material at the outlet opening of a respective supply channel and to convey the filler materials starting therefrom into the at least one cavity. For this purpose, the at least one dispenser comprises a supply lance through which the filler material can be conveyed up to the discharge opening.

The at least one cavity is arranged in the bottom of the battery housing and/or in the bottom of the at least one battery module and is located between said two mentioned bottoms. By means of this cavity or a corresponding flow channel, it is possible to distribute the filler material in a homogeneous and optimal manner between the at least one battery module and the battery housing.

In addition, on the bottom of the at least one battery module and/or of the battery housing at least partially compressible additional material, for example, foam, is applied and/or arranged. By means of this compressible additional material which delimits the at least one cavity, lateral leaking of the supplied filler material is prevented, and thus flow of the filler material into the at least one cavity is controlled.

It should be understood that the above-mentioned features and the features yet to be explained below can be used not only in the indicated combination but also in other combinations or alone, without leaving the scope of the present invention.

BRIEF DESCRIPTION OF THE DRAWINGS

The invention is represented diagrammatically in the drawings in reference to embodiments and described diagrammatically and in detail in reference to the drawings.

FIG. 1a shows, in a diagrammatic representation, examples for an arrangement as known from the prior art.

FIG. 1b shows, in a diagrammatic representation, examples for an arrangement as known from the prior art.

FIG. 1c shows, in a diagrammatic representation, examples for an arrangement as known from the prior art.

The figures are described together and comprehensively; identical components are associated with the same reference numerals.

DETAILED DESCRIPTION

Figure 2:
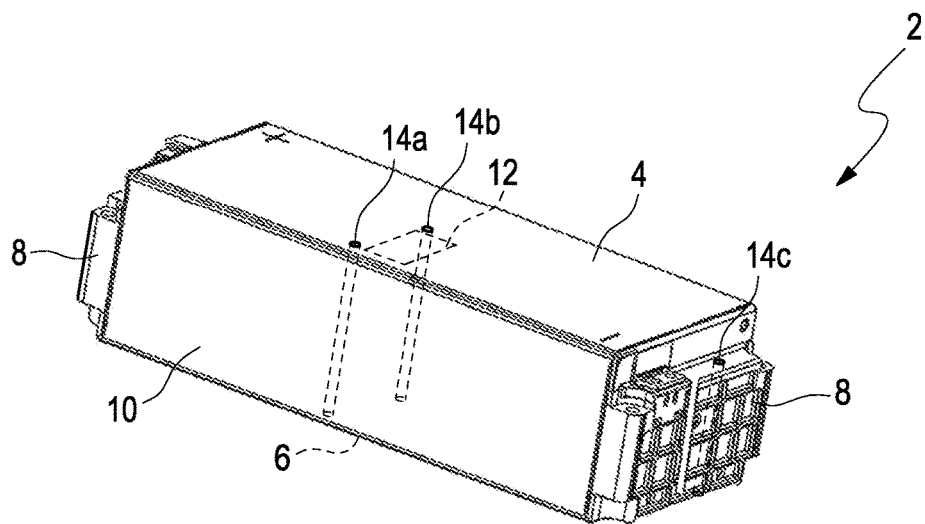
FIG. 2a shows, in a diagrammatic representation, examples for a battery module from different perspectives.
FIG. 2b shows, in a diagrammatic representation, examples for a battery module from different perspectives.
Figure 2:
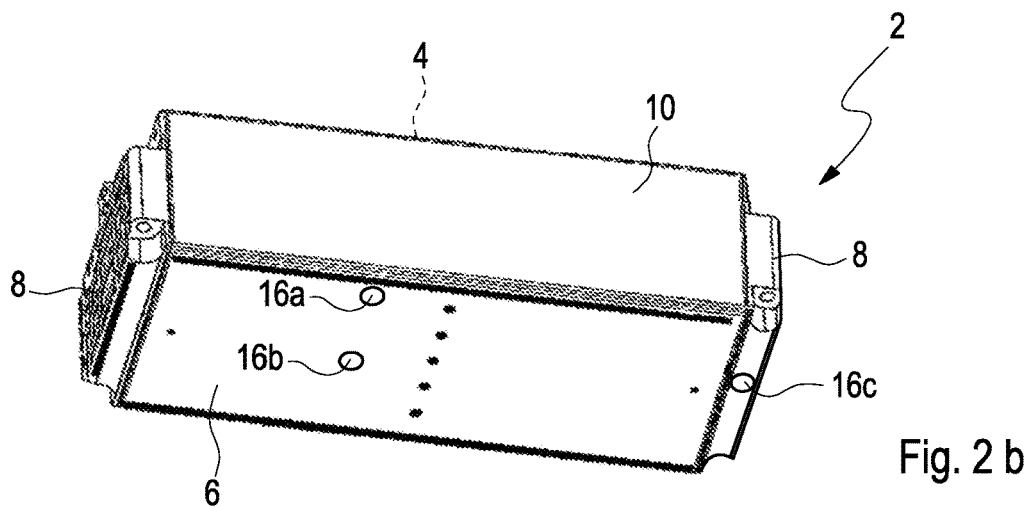

FIG. 1a shows an example of a battery tray 200 or of a battery housing which comprises a plurality of compartments 202. Here, FIG. 1a shows such a compartment 202 alone and a battery module 204 to be inserted in the compartment 202. Here, it is provided that a heat conduction channel 206 is located under a bottom of the compartment 202 (FIG. 1c). Before the battery module 204 is arranged in the compartment 202, the so-called gap filler as filler material 208 is arranged on the bottom of the compartment 202.

Usually, the battery tray 200 is produced as one piece. Here, the bottom of the battery tray 200 has clear unevenness and thus great tolerances, which is why, when a respective battery module 204 is set into a compartment 202, the filler material 208 is used as compensation material in order to be able to remove heat from the battery module 204 and increase the cooling efficiency. From the process standpoint, the filler material 208 is first applied on the bottom and compressed by the setting of the battery module 204, so that it spreads over the bottom of the battery module 206. For an efficient cooling of the battery module 204, a complete wetting with a filler material 208 is necessary, since otherwise air would have a negative effect as insulator.

Accordingly, for example, 31 battery modules 204 are incorporated in the compartments 202 of the battery tray 200 with displacement of the filler material 208. Due to the short process time, it is possible, for example, to apply a bone-shaped bead of the filler material 208 or gap filler bead on the bottom of the respective compartment 202 of the battery wall 200.

Since the compartment 202 for the battery wall 200 and the battery module 204, after having been inserted therein, form a closed system, a required gap filling or wetting with a filler material 208 during a setting process cannot be monitored and also cannot be ensured. Thus, an undefined exit of filler material 208 can lead to wasting of material or to an additional weight of a vehicle for which the arrangement is provided, if, for example, a wetting degree of 98% is required. In addition, due to a deformation or a distortion of the bottom of a respective compartment 202, an even distribution of filler material 208 is not possible. In addition, due to high flow paths of the filler material 208 on the bottom, high pressures can be generated, which can lead to damage to the battery module 204. In addition, a setting and screwing of a screw on the battery module 204 can lead to a high contact pressure by this screw or due to a soft screw joint and thus to a deformation of the battery module 204 by the screw, requiring expensive and cost intensive reworking.

FIG. 2a shows a battery module 2 in diagrammatic representation from a first perspective, and FIG. 2b shows the same battery module 2 from a second perspective. This battery module 2 is designed here as an electrical energy storage for a vehicle, for example, a motor vehicle or car, which is designed to provide electrical energy to an electric machine of the vehicle, wherein the electric machine is designed to move the vehicle. This battery module 2 is delimited by an outer wall which here comprises inter alia a cover 4, a bottom 6 and two pressure plates 8 as well as longitudinal webs 10. These mentioned components of the outer wall of the battery module 2 here enclose multiple battery cells 12.

In addition, as components of an embodiment of the system according to the invention, this battery module 2 comprises multiple supply channels 14a, 14b, 14c which traverse the battery module 2 parallel to an introduction direction in which the battery module 2 is to be arranged in a battery housing. Such supply channels 14a, 14b, 14c comprise outlet openings 16a, 16b, 16c at the bottom 6 of the battery module 2.

Figure 3:
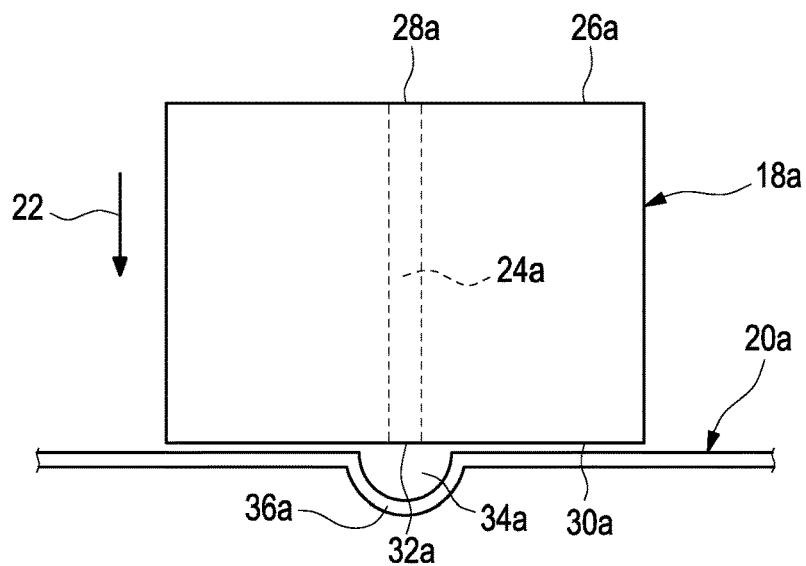
FIG. 3a shows, in a diagrammatic representation, different examples for supply channels as components of embodiments of the system according to the invention.
FIG. 3b shows, in a diagrammatic representation, different examples for supply channels as components of embodiments of the system according to the invention.
FIG. 3c shows, in a diagrammatic representation, different examples for supply channels as components of embodiments of the system according to the invention.
Figure 3B:
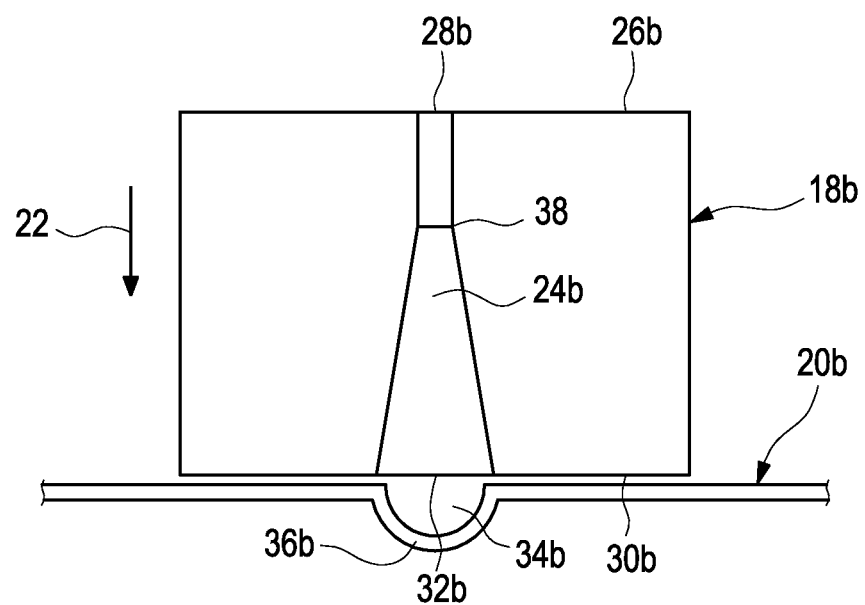
Figure 3:
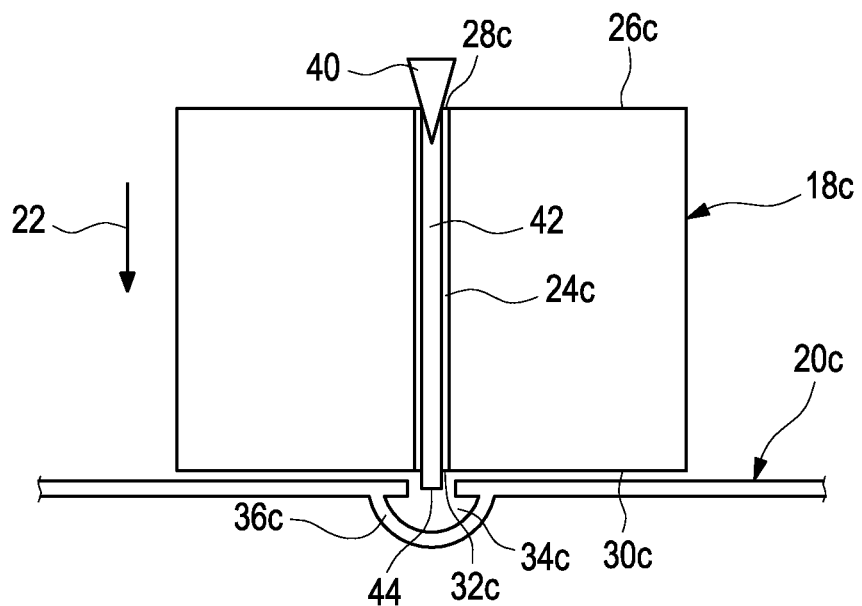

FIGS. 3a, 3b, 3c each show, in a diagrammatic representation, examples for a battery module 18a, 18b, 18c which, when an embodiment of the method according to the invention is carried out, is arranged in a battery housing, wherein, in FIGS. 3a, 3b, 3c, a respective bottom 20a, 20b, 20c of such a battery housing is diagrammatically represented. In all the embodiments of the method, it is provided first that the battery module 18a, 18b, 18c is introduced in an introduction direction, indicated here by an arrow 22, into the battery housing and arranged on the bottom 20a, 20b, 20c thereof. In addition, it is provided that the battery module 18a, 18b, 18c is positioned in a designated end position within the battery housing on the bottom 20a, 20b, 20c and that it is fastened in this end position in and/or on the battery housing. Here, the battery module 18a, 18b, 18c, as component of a respective embodiment of the system according to the invention, comprises a supply channel 24a, 24b, 24c which or the central axis of which passes through the battery module 18a, 18b, 18c parallel to the introduction direction. Here, the supply channel 24a, 24b, 24c comprises, in a cover 26a, 26b, 26c of the battery module 18a, 18b, 18c, an inlet opening 28a, 28b, 28c. In addition, each supply channel 24a, 24b, 24c comprises an outlet opening 32a, 32b, 32c on a bottom 30a, 30b, 30c.

After the battery module 18a, 18b, 18c is introduced in the battery housing, after fastening the battery module 18a, 18b, 18c in the end position, between the bottom 30a, 30b, 30c of the battery module 18a, 18b, 18c and the bottom 20a, 20b, 20c of the battery housing, a cavity 34a, 34b, 34c or a hollow space is formed, wherein the outlet opening 32a, 32b, 32c of the supply channel 24a, 24b, 24c leads into this cavity 34a, 34b, 34c. As soon as the battery module 18a, 18b, 18c is arranged in its end position in the battery housing, a filler material or a gap filler is supplied or conveyed through the supply channel 14a, 14b, 14c, and the cavity 34a, 34b, 34c between the bottom 20a, 20b, 20c of the battery housing and the bottom 30a, 30b, 30c of the battery module 18a, 18b, 18c is filled.

In all three presented examples of a battery arrangement to be produced by the method according to the invention with the system according to the invention, it is provided that the bottom 20a, 20b, 20c, as an additional component of the system, comprises a bead 36a, 36b, 36c which is introduced into the bottom 20a, 20b, 20c and delimits the cavity 34a, 34b, 34c.

In FIG. 3a, the supply channel 24a comprises a cylindrical inner wall between the inlet opening 28a and the outlet opening 32a.

In contrast, in FIG. 3b, it is provided that, between the inlet opening 28b and the outlet opening 32b, a transition site 38 is provided. Here, the supply channel 24b is subdivided into two sections. Here, a first section extends between the inlet opening 28b and the transition site 38, wherein this first section is cylindrical and comprises an inner wall with constant cross-sectional area. The second section extends between the transition site 38 and the outlet opening 32b and comprises a conical or funnel-shaped inner wall, wherein the cross-sectional area of the supply channel 24b broadens starting from the transition site 38 to the outlet opening 32b.

FIG. 3c moreover also shows examples for a dispenser 40 for the supplying or the conveying of the filler material. The dispenser 40 here comprises a supply lance 42, on the end of which a discharge opening 44 for the filler material to be supplied is arranged. In addition, an outer wall of the supply lance 42 has a smaller cross-sectional area than an inner wall of the supply channel 24c which is cylindrical here. Thus, it is possible to introduce the supply lance 42 of the dispenser 40 completely into the supply channel 24c and to arrange the discharge opening 44 outside of the outlet opening 32c of the supply channel 24c in the cavity 34c.

In addition, the bottom 20c of the battery housing here comprises a hole, the cross-sectional area of which is smaller than the cross-sectional area of the bead 36c. The bead 36c and an area between the bottom 20c of the battery housing and the bottom 30c of the battery module 18c are connected to one another via this hole, wherein the mentioned area between the two bottoms 20c, 30c forms the cavity 34c.

When the method is carried out, the discharge opening 44 at the end of the supply lance 42 can be arranged at any suitable respective position within the supply channel 24c and/or the cavity 34c. In addition, the position of the discharge opening 44 can also be changed during the method.

In all the embodiments of the method, after the filler material has been conveyed through a respective supply channel 24a, 24b, 24c into a respective cavity 34a, 34b, 34c, it is optimally distributed between the bottom 20a, 20b, 20c of the battery housing and the bottom 30a, 30b, 30c of the battery module 18a, 18b, 18c, wherein the filler material is used as heat bridge for heat transfer in order to transfer heat from the battery module 18a, 18b, 18c to the battery housing, whereby a cooling efficiency of a battery arrangement provided in this way is improved.

Figure 4:
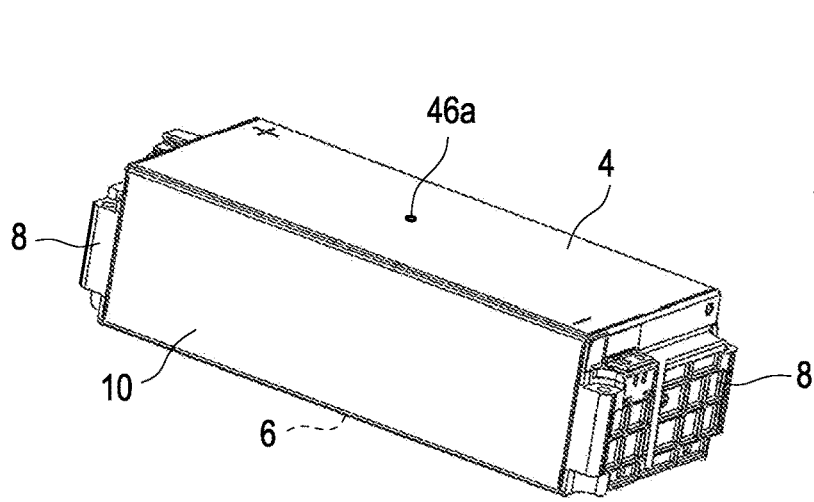
FIG. 4a shows additional examples for battery modules.
FIG. 4b shows additional examples for battery modules.
FIG. 4c shows additional examples for battery modules.
Figure 4:
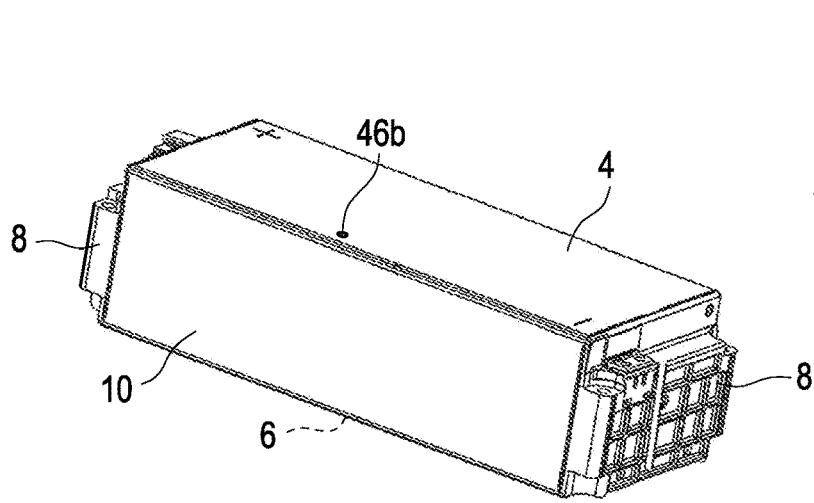
Figure 4:
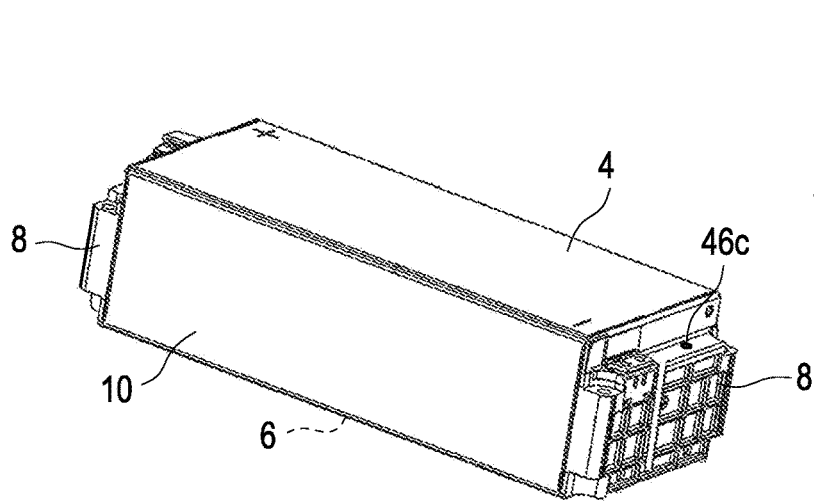

FIGS. 4a, 4b and 4c also show the battery module 2 as already presented with FIGS. 2a and 2b. Here, in the respective FIG. 4a, 4b, 4c, an inlet opening 46a, 46b, 46c of a respective supply channel which passes through the battery module 2 is indicated. Here, one finds a first inlet opening 46a (FIG. 4a) between battery cells of the battery module 2, a second inlet opening 46b (FIG. 4b) in the longitudinal web 10 as an example of an outer wall of the battery module 2, and a third inlet opening 46c in the pressure plate 8 as an additional example of an outer wall of the battery module 2.

The invention claimed is:

1. A system for producing a battery arrangement, comprising:
at least one battery module and a battery housing, wherein the at least one battery module has at least one supply channel which extends in a designated introduction direction through the at least one battery module, wherein the at least one battery module is introduced in the introduction direction into the battery housing, positioned in an end position provided for the battery module and firmly connected in this end position to the battery housing, wherein, between a bottom of the at least one battery module and a bottom of the battery housing, at least one cavity is provided, which is connected to the at least one supply channel, wherein a filler material is filled into the at least one cavity through the at least one supply channel.

2. The system according to claim 1, wherein the at least one battery module includes several components, wherein the at least one supply channel is arranged between at least two components of the at least one battery module and extends between an inlet opening which is accessible from outside and which is arranged on at least one component formed as an outer wall of the at least one battery module, and an outlet opening which leads into the cavity.

3. The system according to claim 2, further comprising:
at least one dispenser for providing the filler material, which includes a discharge opening from which the filler material is conveyed, wherein the discharge opening is arranged at the inlet opening of the at least one supply channel, or wherein the discharge opening is arranged within the supply channel between the inlet opening and the outlet opening.

4. The system according to claim 2, wherein, along the at least one supply channel, between the inlet opening and the outlet opening, a transition site is provided, wherein the at least one supply channel is subdivided into two sections, wherein a first section between the inlet opening and the transition site includes an inner wall with a constant first cross-sectional area, wherein a second section between the transition site and the outlet opening, at the outlet opening, includes an inner wall with a second cross-sectional area which is greater than a cross-sectional area at the transition site or than the first cross-sectional area.

5. The system according to claim 1, further comprising:
on the bottom of the battery housing, at least one bead, which, as a wall of the at least one cavity, is designed to delimit the at least one cavity.

6. A method for producing a battery arrangement, comprising:
at least one battery module and a battery housing, wherein the at least one battery module comprises at least one supply channel which extends, in a designated introduction direction through the at least one battery module, wherein the at least one battery module is introduced in the introduction direction into the battery housing and arranged therein, positioned in an end position provided for the battery module, and firmly connected in this end position to the battery housing and fastened therein, wherein, between a bottom of the at least one battery module and a bottom of the battery housing, at least one cavity is provided, which is connected to the at least one supply channel, wherein a filler material is filled into the at least one cavity through the at least one supply channel.

7. The method according to claim 6, wherein the battery module is screwed to the battery housing and firmly attached to the battery housing.

8. The method according to claim 6, wherein a heat conducting filler material is filled into the at least one cavity through the at least one supply channel.

9. The method according to claim 7, wherein, between the bottom of the at least one battery module and the bottom of the battery housing, compressible material is arranged on at least one margin of the at least one cavity, wherein the at least one battery module is arranged thereafter in the battery housing, wherein the compressible material is designed to delimit the cavity.

\* \* \* \* \*